United States Patent
Raskin

(10) Patent No.: US 11,269,984 B2
(45) Date of Patent: Mar. 8, 2022

(54) METHOD AND APPARATUS FOR SECURING USER OPERATION OF AND ACCESS TO A COMPUTER SYSTEM

(71) Applicant: Sofin Raskin, Los Altos, CA (US)

(72) Inventor: Sofin Raskin, Los Altos, CA (US)

(73) Assignee: JANUS TECHNOLOGIES, INC., Half Moon Bay, CA (US)

( * ) Notice: Subject to any disclaimer, the term of this patent is extended or adjusted under 35 U.S.C. 154(b) by 241 days.

(21) Appl. No.: 14/963,183

(22) Filed: Dec. 8, 2015

(65) Prior Publication Data

US 2017/0076081 A1    Mar. 16, 2017

Related U.S. Application Data

(60) Provisional application No. 62/089,655, filed on Dec. 9, 2014.

(51) Int. Cl.

| G06F 9/4401 | (2018.01) |
|---|---|
| G06F 21/34 | (2013.01) |
| G06F 21/44 | (2013.01) |
| H04L 29/06 | (2006.01) |
| G06F 13/42 | (2006.01) |

(Continued)

(52) U.S. Cl.
CPC ............ *G06F 21/34* (2013.01); *G06F 9/4401* (2013.01); *G06F 13/4282* (2013.01); *G06F 21/44* (2013.01); *G06F 21/575* (2013.01); *H04L 9/3234* (2013.01); *H04L 9/3247* (2013.01); *H04L 63/0442* (2013.01); *H04L 63/0861* (2013.01)

(58) Field of Classification Search
CPC ....... G06F 21/34; G06F 9/4401; H04L 9/3247
See application file for complete search history.

(56) References Cited

U.S. PATENT DOCUMENTS 6,038,320 A * 3/2000 Miller .................... G06F 21/34
380/44
8,813,218 B2    8/2014  Wang et al.

(Continued)

OTHER PUBLICATIONS

U.S. Appl. No. 14/846,768, filed Sep. 5, 2015.

*Primary Examiner* — Paul Yen
(74) *Attorney, Agent, or Firm* — Foley & Lardner LLP

(57) ABSTRACT

The present invention provides methods and apparatuses for computer system security. According to certain aspects, embodiments of the invention comprise a portable storage device that, when attached, "unlocks" a computer system, such as a desktop, laptop, tablet computer running a conventional operating system such as Windows, thereby creating added security. More particularly, embodiments of the invention use a standard USB memory stick as an "ignition key" to unlock and operate a PC, tablet or other computer system. The ignition key can be required to boot the computer, utilize peripheral devices, ports, network connections, a keyboard and/or a mouse of the computer system, and limit access to certain parts of computer. According to further aspects, in these and other embodiments, the invention is implemented using a modified BIOS that prevents a computer from fully booting into an operational state until verifying the presence of, and information stored on the "ignition key" connected to the computer.

16 Claims, 2 Drawing Sheets

(51) Int. Cl.
*H04L 9/32* (2006.01)
*G06F 21/57* (2013.01)

(56) References Cited

U.S. PATENT DOCUMENTS

| | | | |
|---|---|---|---|
| 8,868,898 B1* | 10/2014 | Van Hoof | G06F 21/575 |
| | | | 710/200 |
| 2008/0083019 A1* | 4/2008 | Wang | G06F 21/31 |
| | | | 726/5 |
| 2011/0051352 A1* | 3/2011 | Kim | H05K 5/0278 |
| | | | 361/679.31 |
| 2011/0113235 A1* | 5/2011 | Erickson | G06F 21/34 |
| | | | 713/152 |
| 2013/0283079 A1* | 10/2013 | Puthiyedath | G06F 1/3234 |
| | | | 713/323 |
| 2014/0007226 A1* | 1/2014 | Inoue | G06F 21/34 |
| | | | 726/19 |
| 2015/0058587 A1 | 2/2015 | Wang et al. | |
| 2015/0058970 A1 | 2/2015 | Raskin et al. | |
| 2016/0055007 A1* | 2/2016 | Toriyama | G06F 9/44505 |
| | | | 713/2 |

* cited by examiner

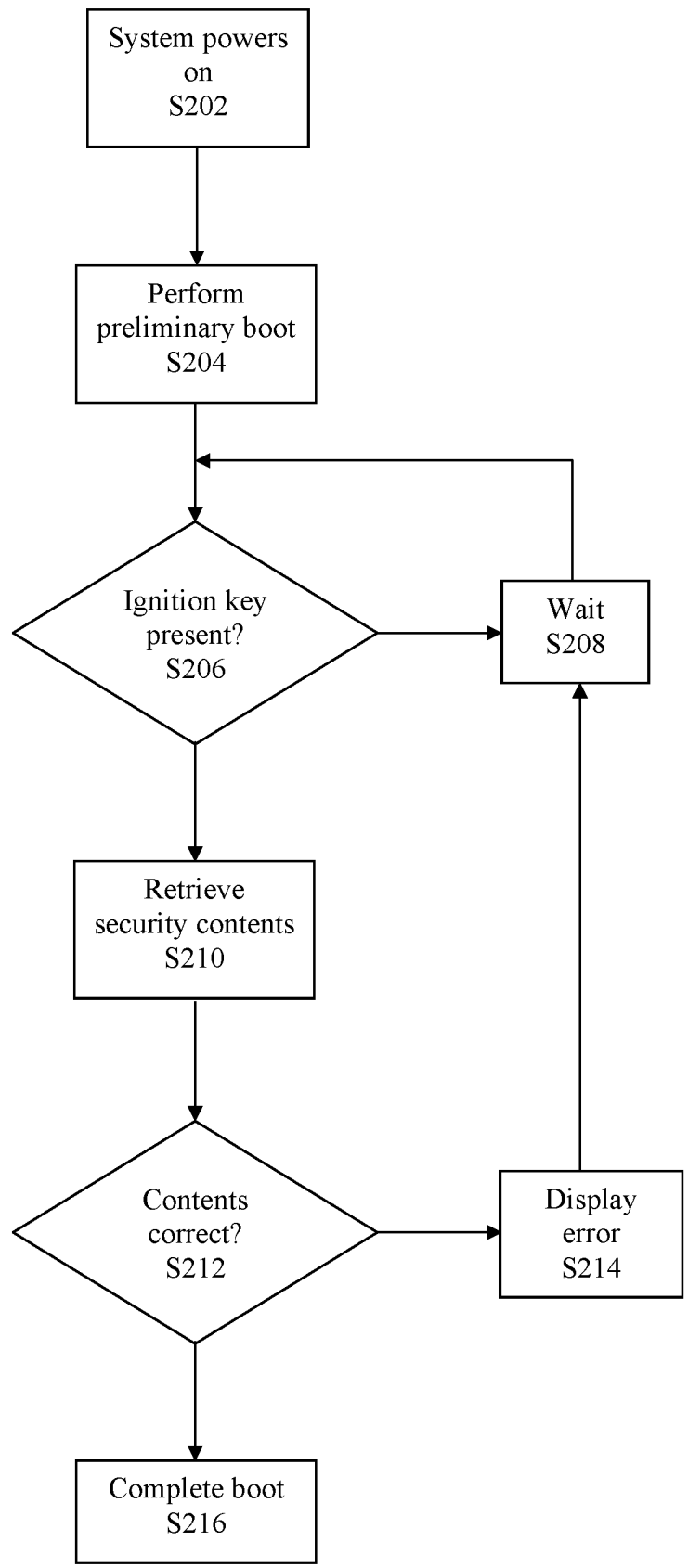

METHOD AND APPARATUS FOR SECURING USER OPERATION OF AND ACCESS TO A COMPUTER SYSTEM

CROSS-REFERENCE TO RELATED APPLICATIONS

The present application claims priority to U.S. Provisional Application No. 62/089,655 filed Dec. 9, 2014, the contents of which are incorporated by reference herein in their entirety.

FIELD OF THE INVENTION

The present invention relates to computer systems, and more particularly to portable storage device that is used together with an inventive BIOS to implement computer system security methods and apparatuses.

BACKGROUND OF THE INVENTION

U.S. Pat. No. 8,813,218, the contents of which are incorporated by reference herein in their entirety, dramatically advanced the state of the art of computer system security. However, opportunities for improvement remain.

SUMMARY OF THE INVENTION

The present invention provides methods and apparatuses for computer system security. According to certain aspects, embodiments of the invention comprise a portable storage device that, when attached, "unlocks" a computer system, such as a desktop, laptop, tablet computer running a conventional operating system such as Windows, thereby creating added security. More particularly, embodiments of the invention use a standard USB memory stick as an "ignition key" to unlock and operate a PC, tablet or other computer system. The ignition key can be required to boot the computer, utilize peripheral devices, ports, network connections, a keyboard and/or a mouse of the computer system, and limit access to certain parts of computer. According to further aspects, in these and other embodiments, the invention is implemented using a modified BIOS that prevents a computer from fully booting into an operational state until verifying the presence of, and information stored on the "ignition key" connected to the computer.

In furtherance of these and other aspects, a computer system according to embodiments of the invention includes a port for connecting a removable device to the computer system, and a Basic Input Output System (BIOS) stored on the computer system that uses data on a storage device connected to the port to control access to the computer system.

In additional furtherance of these and other aspects, a method according to embodiments of the invention includes detecting whether a storage device is connected to a removable device port of a computer system, and using a Basic Input Output System (BIOS) stored on the computer system to control access to the computer system based on data stored on the storage device.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 2 is a flowchart illustrating an example methodology of managing computer system functionality using an ignition key and BIOS according to embodiments of the invention.

DETAILED DESCRIPTION OF THE PREFERRED EMBODIMENTS

Figure 1A:
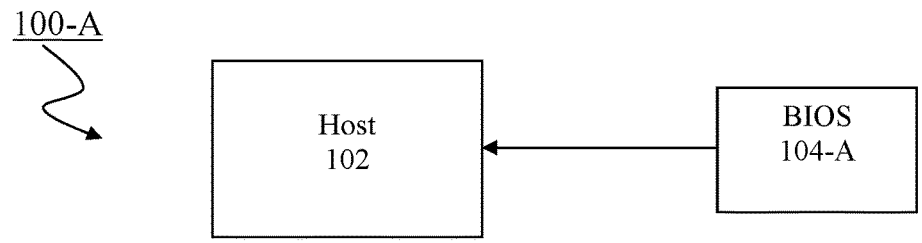
FIG. 1A is a block diagram of a conventional computer system.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In embodiments, the invention comprises a portable storage device that, when attached, "unlocks" a computer system, such as a desktop, laptop, tablet computer running a conventional operating system such as Windows, thereby creating added security. More particularly, embodiments of the invention use a standard USB memory stick as an "ignition key" to unlock and operate a PC, tablet or other computer system. The ignition key can be required to boot the computer, utilize peripheral devices, ports, network connections, a keyboard and/or a mouse of the computer system, and limit access to certain parts of computer.

In embodiments, the invention is implemented using a modified BIOS that prevents a computer from fully booting into an operational state until verifying information stored on a memory device connected to the computer. Those skilled in the art will be able to understand how to adapt a conventional BIOS (e.g. a BIOS provided by Phoenix Technologies, Inc.) for use in the present invention after being taught by the present disclosure.

The present invention can be utilized in many different contexts. In an enterprise context, employees each carry their own key, which prevents other employees from snooping. By removing the USB key, no one else can see the data in the computer. In a point of sale (POS) context, for example, a cash register, employees each have their own personal key that will enable use of the cash register (in addition or instead of entering their employee number, etc.). In a controlled access context, the invention provides a log of who used a computer, and when. In a consumer use context, embodiments of the invention can provide security for example if a traveler leaves a computer in a hotel room during the day when out sight-seeing. Alternatively, the invention can allow a parent to lock a child out of one or more features of computer, or the whole computer.

To assist in illustrating aspects of the invention, FIG. 1A is a block diagram illustrating an example conventional computer system 100-A having a host complex 102. In desktop or notebook computer embodiments, host complex 102 includes a host processor CPU such as an x86 processor from Intel Corp. or AMD. In these and other embodiments, host complex 102 can further include a platform controller hub (PCH), which for example is a chipset component from Intel Corp. It should be noted that host complex 102 can include other components such as program memory (e.g. DDR memory) for running applications. However, the details thereof will be omitted here for sake of clarity of the invention. Moreover, as is known, in a conventional computer system, a host complex including a PCH includes connections to peripherals such as I/O devices and ports, graphics/display controllers, network interfaces, disk drives, expansion buses (e.g. PCI, PCIe), etc.

As shown, in a conventional system, a host complex 102 typically first boots up by accessing BIOS code 104-A. This code 104-A is typically stored in a dedicated memory such as ROM or non-volatile RAM. As is known, the BIOS code includes code to initialize and test the system hardware components, and to provide an abstraction layer for the hardware, i.e., a consistent way for application programs and operating systems to interact with the keyboard, display, and other input/output (I/O) devices. Variations in the system hardware are thus hidden by the BIOS from programs that use BIOS services instead of directly accessing the hardware. In x86 example embodiments, the BIOS code can also include a management engine (ME) image.

The BIOS 104-A also includes a boot loader for loading an operating system (OS) into the host complex 102's program memory (not shown) after successfully booting from the BIOS. Typically, the OS (e.g. Windows, Apple OS, Linux, etc.) is stored in an external mass memory device such as a hard disk drive or an internal solid state memory drive. Once the OS is loaded, a user is typically able to use the computer system 100-A to run applications via a graphical user interface (GUI) and peripherals (e.g. keyboard, mouse, etc. not shown). These applications are also typically stored in an external or internal mass memory device and loaded by the OS into the CPU 102's program memory.

In a typical desktop or notebook computer example, host complex 102 and BIOS 104-A are integrated together on the same motherboard, while the OS can be stored in an external mass memory device such as a hard disk drive as described above or also together on the motherboard as a solid state memory drive. It should be apparent that such a motherboard can include various other components such as peripheral controllers and interfaces, memory controllers, expansion buses (e.g. PCI, PCIe), program memories and the like. However, more detailed explanations of such other components will be omitted here for sake of clarity of the invention.

After system 100-A boots, an operating system or other software can ask a user to enter credentials such as a username and/or password in order to begin using the system, 100-A. However the present inventors recognize that these techniques have many limitations. For example, in an enterprise context, various employees can have access to the same system, and this allows employees to access data (e.g. confidential data) of other employees. In a consumer use context, if a traveler leaves a computer in a hotel room during the day when out sight-seeing, the computer can be stolen or surreptitiously used to access personal data.

Figure 1B:
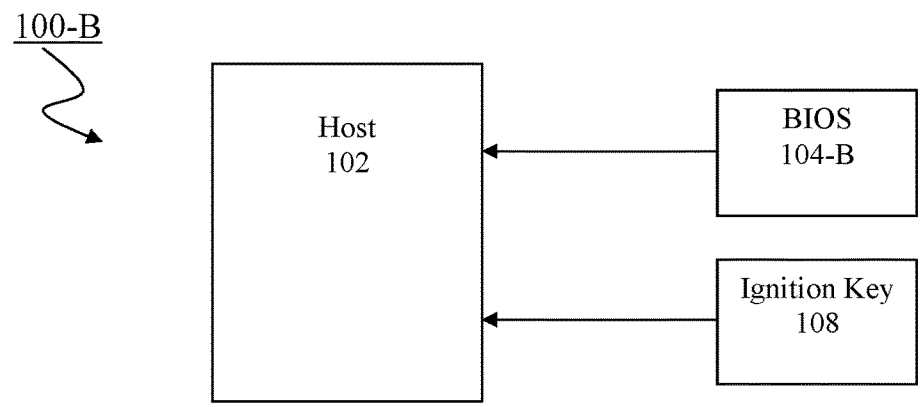
FIG. 1B is a block diagram of a computer system having secure access and operation functionality according to embodiments of the invention.

FIG. 1B is a block diagram illustrating an example secure computer system 100-B according to embodiments of the invention.

As shown, in addition to the components described above, system 100-B includes a removable ignition key 108. In embodiments to described in more detail below, ignition key 108 is implemented by a conventional USB memory stick having authentication information stored thereon. However, the invention is not limited to this example embodiment. For example, ignition key 108 can be implemented by other removable memory media such as SD devices, CF devices, etc.

As further shown, system 100-B includes a modified BIOS 104-B that preferably includes all the conventional functionality of BIOS 104-A described above, and further including authentication functionality to be described in more detail below. In general, however, this authentication functionality includes, during an initial boot sequence, detecting whether the ignition key 108 is present and attached to system 100-B, and preventing a full operational boot of system 100-B until the authentication information stored on key 108 has been verified.

Although example implementations of secure computer system 100-B will be described below in connection with desktop or notebook computer configurations, embodiments of the invention are not limited to these configurations, and the principles of the invention can be extended to other types of computer configurations such as thin clients, tablet or pad computers, smart phones, servers, and any other type of computing device such as video conferencing units, ATM machines, industrial controls, etc.

Figure 1C:
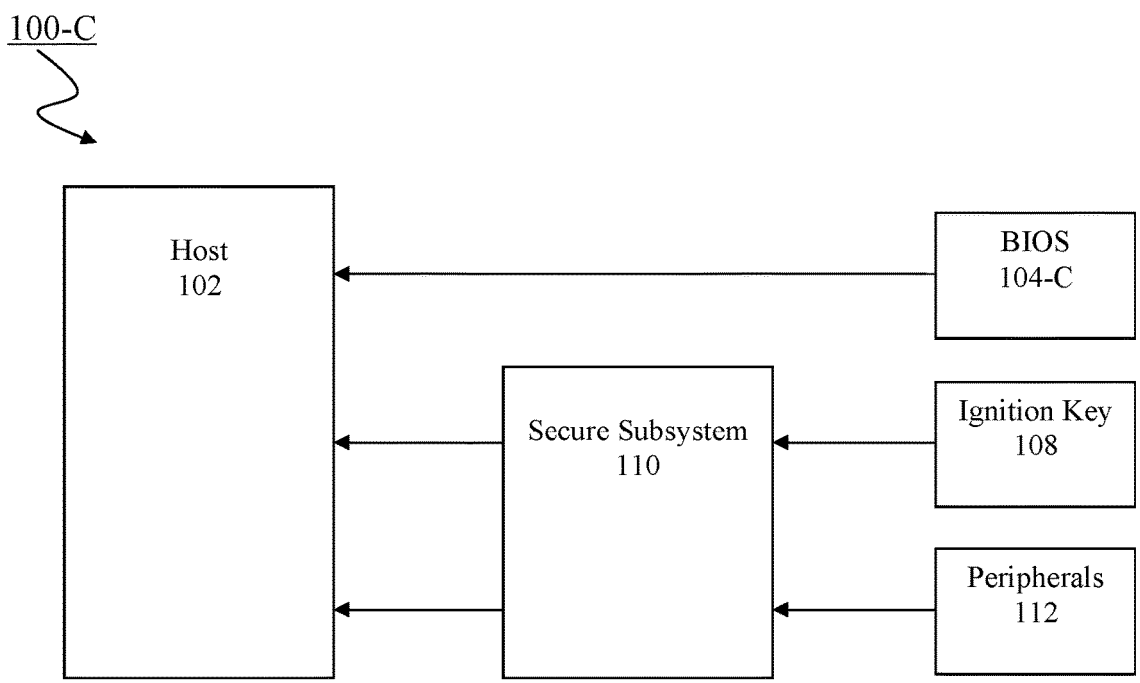
FIG. 1C is a block diagram of a computer system having secure access and operation functionality according to alternative embodiments of the invention.

FIG. 1C is a block diagram illustrating an example secure computer system 100-C according to additional or alternative embodiments of the invention.

As shown in FIG. 1C, in addition to the components described above, secure computer system 100-C includes a secure subsystem 110 that is interposed in the path between the host complex 102 and peripherals 112, as well as in the path between host complex 102 and ignition key 108. As such, secure subsystem 110 allows for additional security features to be controlled or configured by information on ignition key 108. This information can include a list of allowed devices among peripherals 112, a list of blocked devices, firewall rules, a list of authorized users, approved applications, encryption keys for performing transparent encryption of data on hard disk and/or USB drives, etc.

In embodiments, secure subsystem 110 is implemented as an ASIC (e.g. a JT500 secure processor from Janus Technologies, Inc.). In these and other embodiments, secure complex 110 further includes a processor core running embedded software and/or operating system (e.g. Linux) and application software stored in dedicated memory for implementing the additional security functionality. Secure subsystem 110, host complex 102 and BIOS 104-C can be integrated together on the same motherboard, and such a motherboard can include various other components such as peripheral controllers and interfaces, memory controllers, expansion buses, program memories and the like.

Peripherals 112 can include I/O devices and ports (e.g. USB), graphics controllers, network interfaces and controllers, hard drives, etc. In these embodiments of the invention, host complex 102 does not have any direct connections to these peripherals. Rather, some or all of them are emulated by and presented to the host complex 102 via secure complex 110, completely transparently to host complex 102 and applications running thereon. Various implementation details of how this can be done in example embodiments of the invention are described in U.S. Pat. Nos. 9,231,921 and 9,424,443, the contents of which are incorporated by reference herein in their entirety.

It should be noted that system 100-B or 100-C can be completely pre-configured with the security functionality of the present invention. However, it should be noted that it may be possible for a system 100-A to be converted for use with the present invention by replacing BIOS 104-A with BIOS 104-B or 104-C and providing users of the converted system with an ignition key 108 as described in more detail below.

As shown, ignition key 108 in this example embodiment is connected to secure subsystem 110, rather than to host complex 102. Accordingly, BIOS 104-C in these example embodiments can include similar functionality as described above in connection with BIOS 104-B, and can include additional functionality for communicating with secure subsystem 110 to configure system 100-C according to information stored on ignition key 108 via a communications channel during a boot sequence. An example implementation of such a communication channel is described in co-pending U.S. application Ser. No. 14/846,768, the contents of which are incorporated herein by reference in their entirety.

The following are example implementation details of an ignition key 108 according to the above and other embodiments of the invention.

In embodiments, ignition key 108 contains one or more structured blocks of information. For example, an information block can include a security sub-block and a payload sub-block. The security sub-block contains: (1) Ignition key ID in the form of a serial number, USB ID or UUID; (2) dependent key IDs (optional); (3) system or PC ID in the form of a serial number or UUID (optional); and (4) a cryptographic signature of the entire information block. The payload sub-block contains: (1) BIOS settings (optional); (2) Hard Disk, USB drives and SSL encryption keys and certificates (optional); (3) VPN settings and certificates (optional); and (4) custom data (optional).

In these and other embodiments, an ignition key 108 for use with a given computer system 100-B or 100-C is generated by a key service that is deployed within an organization's network or accessible to an organization via the Internet. The service can have a repository for provisioning keys for all the users of the organization or the key service can be integrated with an existing user repository of the organization. In either event, security settings for every individual and system 100-B or 100-C of the organization can be controlled and centralized using ignition keys 108 provided to the users, as well as configuring systems 100-B or 100-C with a BIOS 104-B or 104-C according to embodiments of the invention. It should be noted that there is not necessarily a one-to-one correspondence between users and systems 100-B or 100-C. For example, a single user can have several keys 108 for several different systems 100-B or 100-C, as configured by the key service. Likewise, a single system 100-B or 100-C can be used by several users with different keys 108.

In the example security sub-block described above, every ignition key 108 has a unique key ID. As is known, every USB device has a device class and there is a specific class for USB flash drives such as those that can be used to implement ignition key 108. Moreover, every USB device has a device ID or UUID. When an ignition key 108 is first created using a non-configured USB flash drive device, the key service obtains the device ID of the USB device. Since the security sub-block contains the device ID this makes it impossible to copy an ignition key 108 using a different USB memory device.

The PC ID information in the example security sub-block described above allows the ignition key 108 to be bound to the computer system 100-B or 100-C it was created for. In one example, the PC ID information is created by the BIOS 104-B or 104-C and stored in the BIOS flash memory. When the ignition key 108 is being created, the key service obtains this PC ID from the BIOS 104-B or 104-C from the computer system 100-B or 100-C for which the key 108 is being created. In another example, every computer system 100-B or 100-C stores its own public key for its ignition key 108. So, for every pair of ignition key 108 and system 100-B or 100-C, the key service generates a unique pair of private and public keys.

As set forth in the above example, the security sub-block of ignition key 108 can optionally include dependent keys. For example, this allows two or even more ignition keys to create a collective responsibility. In this case the dependent IDs field in the security sub-block contains a list of the keys which must be connected to the computer system 100-B or 100-C at the same time so as to "unlock" the system. All the dependent keys can either contain the same information except for the key ID or the encryption keys and other data (e.g. payload data) can be split among the multiple keys.

In the example ignition key 108 data structure set forth above, a cryptographic signature is generated based on the contents of the security sub-block. The cryptographic signature is generated by the key service using a public key that is available to computer system 100-B or 100-C as described in more detail below.

As further set forth above in the above example data structure of ignition key 108 includes a payload sub-block. This can include BIOS settings that can be used to override the settings stored in the BIOS flash during the time when the key is connected. Those settings can include settings for hardware interfaces (e.g. enable/disable use of disk drives or other devices of system 100-B or 100-C, list of allowed devices such as types of USB devices that can be connected to system 100-B or 100-C, list of blocked devices), firewall rules that can be implemented by a NIC or network access software of system 100-B or 100-C, list of authorized users who can log into the system 100-B or 100-C after the operating system boots, approved applications, etc. The payload sub-block can also contain encryption keys for the hard disk, USB drives and SSL encryption, as well as security certificates and other settings to establish a VPN connection with a secure server in example embodiments of computer system 100-C having a secure subsystem 110 as described in more detail in the co-pending applications. In addition, the BIOS 104-B or 104-C can provide access for the operating system to custom data stored in the payload sub-block of key 108 (perhaps enabled with a special driver). This feature allows integrating the ignition key 108 security functionality into other third party security solutions.

FIG. 2 is a flowchart illustrating an example methodology for securing a computer system using an ignition key 108 that can be implemented by a BIOS 104-B or 104-C according to embodiments of the invention.

As shown in FIG. 2, in a first step S202, system 100-B or 100-C powers up. This can include conventional computer system power reset circuitry and functionality controlled host CPU 102.

In a next step S204, similar to the conventional manner, the BIOS 104-B or 104-C starts being executed by host 102. However, unlike the conventional BIOS, in step S204 the BIOS 104-B or 104-C only performs a very preliminary boot to enable performance of a very limited number of functions as will be understood by those skilled in the art based on the further descriptions herein.

Importantly in this regard, in a next step S206, the BIOS 104-B or 104-C checks whether an ignition key 208 is connected to the system 100-B or 100-C. In the example implementation where key 208 is implemented as a USB memory device, this step S206 includes the BIOS 104-B or 104-C enabling USB driver functionality and checking USB ports of the system 100-B or 100-C. If a USB device is found attached to a USB port, the step S206 further includes determining whether that USB device is an ignition key 208. This can be done by first checking the device class of the USB device, and if that indicates a flash drive, then further checking if the drive includes a security sub-block as described above.

If the BIOS 104-B or 104-C determines in step S206 that no ignition key 208 is present, processing branches to step S208 where the BIOS 104-B or 104-C waits for the ignition key 208 to be connected. This can include simply waiting until the BIOS 104-B or 104-C detects a new USB device being connected or it may include entering a sleep state for a predetermined amount of time. In embodiments, this step S208 may further include displaying a message screen indicating that no ignition key 208 was detected and/or prompting the user to connect an ignition key 208. After the waiting period expires, processing returns to step S206.

When the ignition key 208 is connected as determined in step S206, processing continues to step S210 where the key's content is extracted by the BIOS 104-B or 104-C and then step S212 where it is determined whether the contents are valid.

First, for example, the BIOS 104-B or 104-C verifies the authenticity and integrity of the contents of connected key 108 by validating the cryptographic signature extracted from the security sub-block with a public key. There are various possible ways that the public key can be made accessible to BIOS 104-B or 104-C. For example, the public key can be stored in the same flash or other memory in which the code for BIOS 104-B or 104-C is stored. The storage of the public key can be performed when the system 100-B or 100-C is first configured by an administrator or similar personnel, such as by entering the public key along with other BIOS settings in a BIOS setup sequence provided by BIOS 104-B or 104-C. Or the public key can be hard-coded together with the code BIOS 104-B or 104-C. As yet another example, the public key can be retrieved from a key service, for example, via a network and secure connection set up by BIOS 104-B or 104-C for every boot sequence.

Next, for further verification, the BIOS 104-B or 104-C can compare the key ID provided in the contents of the security sub-block with the actual UUID of the ignition key 108, as well as compare the PC ID from the contents of the security sub-block with the actual ID of the system 100-B or 100-C.

Once the ignition key is connected and verified, processing advances to step S216 where the BIOS 104-B or 104-C fully boots system 100-B or 100-C and loads the operating system. Otherwise processing branches to step S214 where, for example, the BIOS 104-B or 104-C displays an error screen. In one example shown in FIG. 2, processing can thereafter return to step S208 where the BIOS 104-B or 104-C waits for a new key to be inserted. In other possible examples, the BIOS 104-B or 104-C can cause the system 100-B or 100-C to power down.

It should be noted that step S216 can include additional processing depending on the payload sub-block contents of the ignition key 108 according to example embodiments of the invention. For example, if the payload sub-block contains BIOS settings, BIOS 104-B or 104-C in step S216 uses them to override the settings stored in the BIOS flash. Moreover, in embodiments such as system 100-C having a secure subsystem 110, the payload sub-block can also contain encryption keys for the hard disk, USB drives and SSL encryption, as well as security certificates and other settings to establish a VPN connection with a secure server. Accordingly in these embodiments, step S216 can include the BIOS 104-C putting the system 100-C into sleep mode after communicating with the secure subsystem 110 to configure the system for transparent encryption/decryption and other secure system functionality as described in more detail in the co-pending applications and as applicable in view of the payload contents.

In embodiments, even after the complete system boot in step S216, the BIOS 104-B or 104-C can resume processing again at step S210 and recheck the ignition key 108 contents after a random or predetermined period amount of time. Moreover, if the ignition key 108 gets disconnected after the system boot in S216, the BIOS 104-B or 104-C can perform shutdown functions such as disabling all the interfaces, and disabling some or all peripherals 112 such as turning off the display, speakers, camera and microphone and/or disabling a keyboard and mouse. It should be noted that in other embodiments, the ignition key 108 may specify fewer restrictions, such as simply disabling one or more interfaces. The BIOS 104-B or 104-C can then return to step S208 and detect when the ignition key 108 is reconnected.

Embodiments of the invention where a key service keeps a user repository of keys, it can be possible for users to recover their ignition keys. In these example embodiments, since the lost key is considered compromised, the encryption keys stored on it should be replaced. For that purpose the recovered key 108 contains two data blocks. The first block contains a copy of the compromised key data block to access the data existing on the system 100-B or 100-C. The second block contains data to be used by the BIOS after the data are successfully decrypted with the keys stored in the first block. After the recovery is done, BIOS 104-B or 104-C removes the first block from the recovered key 108.

In some embodiments, all the data on the ignition key 108 are stored unencrypted. However, it is possible to improve security by encrypting the contents of the ignition key with a symmetric algorithm like AES. That will require storing the encryption key in the BIOS flash.

In these and other embodiments, in addition to self-authenticating the ignition key 108 as described above, the BIOS 104-B or 104-C can request a key service or other management entity to confirm ignition key validity. In that case it can be possible to invalidate lost or stolen ignition keys, or to invalidate the ignition key of a terminated employee. This will require storing the network address of the management entity in the BIOS flash and to implement the SSL protocol on the BIOS level.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer system, comprising:
a port for connecting a removable device to the computer system; and
a Basic Input Output System (BIOS) stored on the computer system that uses data on a storage device connected to the port to control access to the computer system, wherein in an initial boot process of the computer system, the BIOS is configured to determine if an appropriate type of the removable device is connected to the port, and if it is connected, the BIOS is further configured to halt the boot process and either shut down the computer system unless the BIOS can retrieve and verify the data from the connected device or display an error screen if the BIOS cannot verify that the appropriate type of the removable device contains the data,
wherein the data comprises an ignition key ID, and one or both of a system ID, and a cryptographic signature, and
wherein the storage device has an ID that is unique to the storage device and is in the form of a USB ID or a universally unique identifier (UUID), and wherein the verification performed by the BIOS during the initial boot process includes determining if the ID of the storage device is the same as the ignition key ID in the data.

2. A computer system according to claim 1, further comprising an operating system stored on the computer system, wherein the BIOS is further operative to prevent the operating system from being loaded into program memory of the computer system until the data on the storage device has been retrieved and has been verified as being authentic.

3. A computer system according to claim 1, further comprising interfaces to peripheral components including one or more of a display, a mouse and a keyboard, wherein the BIOS is operative to disable certain or all of the interfaces if the storage device is determined to be disconnected from the port.

4. A computer system according to claim 1, further comprising flash memory for storing the BIOS.

5. A computer system according to claim 1, wherein the computer system has an ID, and wherein the verification performed by the BIOS during the initial boot process includes determining if the computer system ID matches the system ID.

6. A computer system according to claim 1, wherein the storage device has a block containing the ignition key ID and the system ID, and wherein the verification performed by the BIOS during the initial boot process includes determining if the cryptographic signature can be verified with a public key.

7. A computer system according to claim 1, wherein the port comprises a Universal Serial Bus (USB) port.

8. A computer system according to claim 1, further comprising interfaces to peripheral components including one or more of a disk drive, a USB device and a network access card (NIC), wherein the BIOS is operative to override default BIOS settings so as to disable certain or all of the interfaces based on settings provided in the data on the storage device.

9. A method, comprising:
detecting whether a storage device is connected to a removable device port of a computer system; and
using a Basic Input Output System (BIOS) stored on the computer system to control access to the computer system based on data stored on the storage device, wherein in an initial boot process of the computer system, the BIOS is configured to, determine if an appropriate type of the removable device is connected to the port, and if it is connected, the BIOS is further configured to halt the boot process and either shut down the computer system unless the BIOS can retrieve and verify the data from the connected device or display an error screen if the BIOS cannot verify that the appropriate type of removable device contains the data,
wherein the data comprises an ignition key ID, and one or both of a system ID, and a cryptographic signature, and
wherein the storage device has an ID that is unique to the storage device and is in the form of a USB ID or a universally unique identifier (UUID), the method further comprising using the BIOS verification performed by the BIOS during the initial boot process includes determining if the ID of the storage device is the same as the ignition key ID in the data.

10. A method according to claim 9, further comprising using the BIOS to prevent an operating system from being loaded into program memory of the computer system until after the storage device is detected as being connected and the data on the storage device has been retrieved and has been verified as being authentic.

11. A method according to claim 9, wherein the computer system includes interfaces to peripheral components including one or more of a display, a mouse and a keyboard, the method further comprising using the BIOS to disable certain or all of the interfaces if the storage device is determined to be disconnected from the port.

12. A method according to claim 9, further comprising storing the BIOS in a flash memory of the computer system.

13. A method according to claim 9, wherein the removable device port comprises a Universal Serial Bus (USB) port.

14. A method according to claim 9, further comprising interfaces to peripheral components including one or more of a disk drive, a USB device and a network access card (NIC), wherein the BIOS is operative to override default BIOS settings so as to disable certain or all of the interfaces based on settings provided in the data on the storage device.

15. A method according to claim 9, wherein the computer system has an ID, the method further comprising using the BIOS to verification performed by the BIOS during the initial boot process includes determining if the computer system ID matches the system ID.

16. A method according to claim 9, wherein the storage device has a block containing the ignition key ID and the system ID, the method further comprising using the BIOS to verification performed by the BIOS during the initial boot process includes determining if the cryptographic signature can be verified with a public key.

* * * * *